Patented Apr. 11, 1950

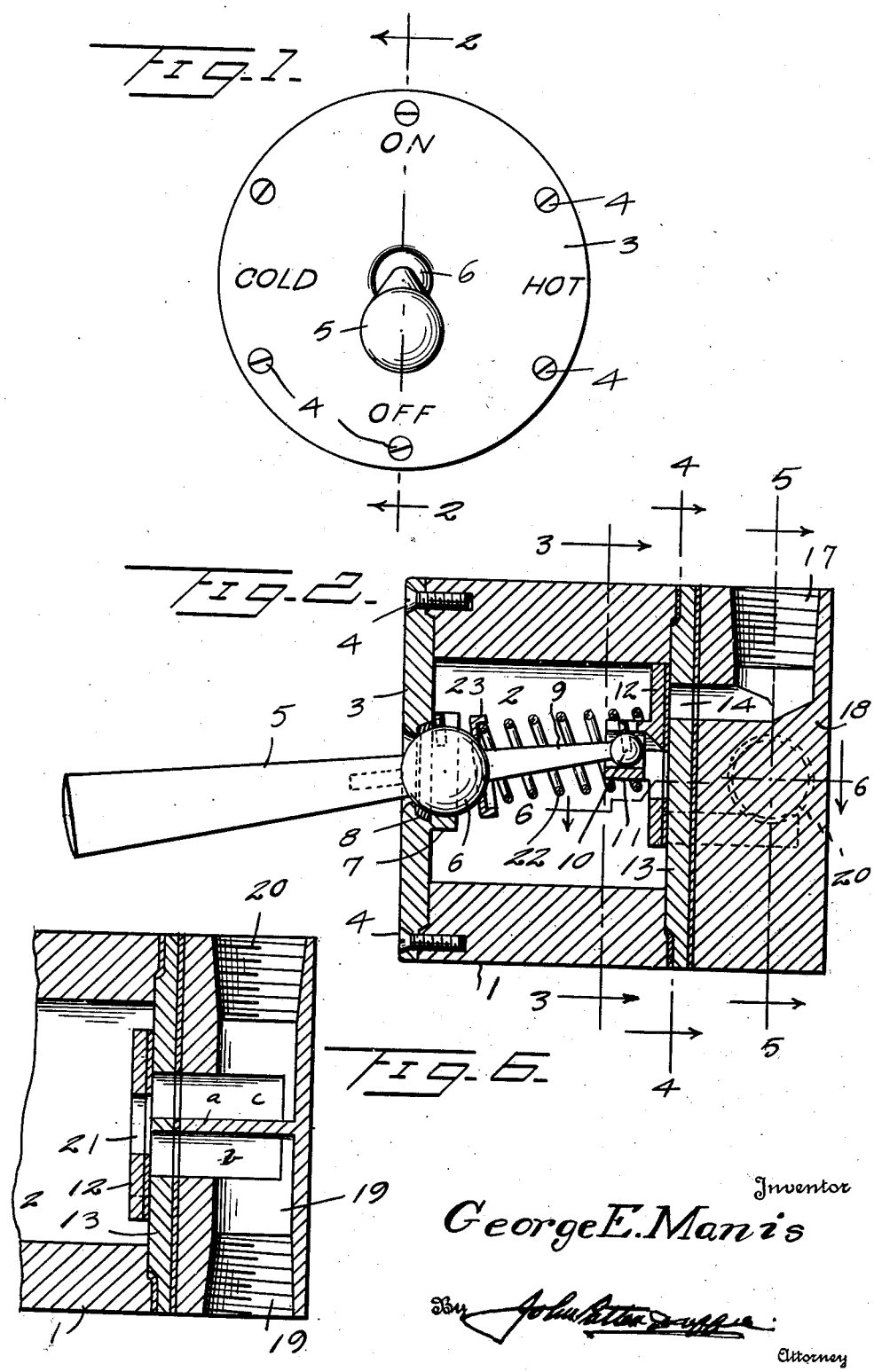

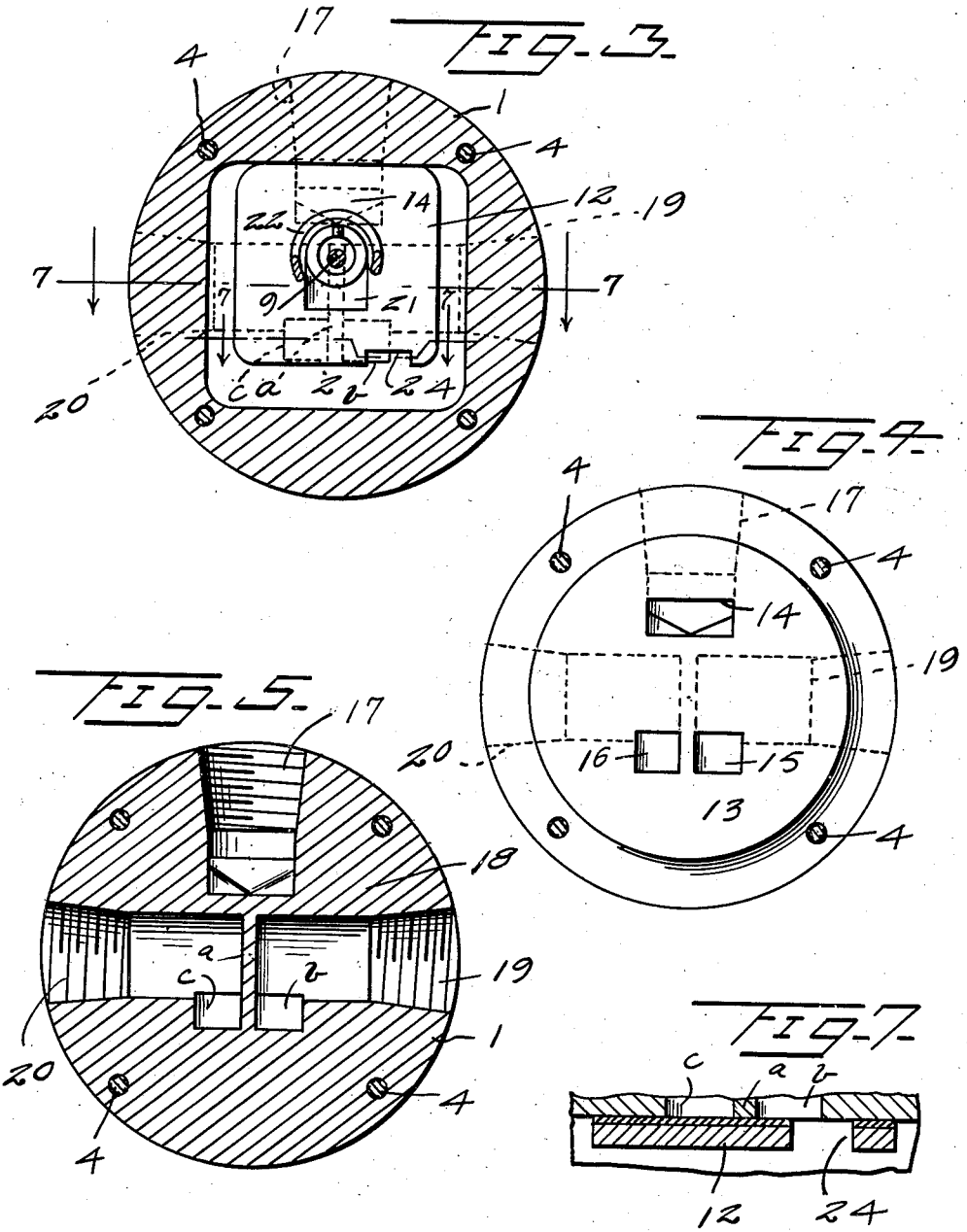

2,503,881

UNITED STATES PATENT OFFICE 2,503,881

MIXING AND VOLUME CONTROL VALVE FOR HOT AND COLD WATER

George E. Manis, Huntington, Ind.

Application July 9, 1946, Serial No. 682,365

1 Claim. (Cl. 251—74)

This invention relates to new and useful improvements in mixing and volume control valves for hot and cold water.

One object of my invention is to provide a valve of this character in which the temperature and volume can be completely controlled through the use and proper manipulation of a single hand lever.

A further object of my invention is to provide a valve of the character specified, in which the volume of the delivered stream can be changed or regulated without changing the relative mixture of the hot and cold water, or in which the reverse may be accomplished, that is to say, whereby the mixture of the hot and cold water may be varied or regulated without changing the volume.

A still further object of my invention is to provide a novel form of valve plate that will always permit a certain amount of flow or leakage of water, either hot or cold, in the main mixing chamber, in order to balance or equalize the pressure on the valve plate and permit a lighter spring to be used.

Still another object of my invention is to provide a mixing and volume control valve construction, which permits its easy and ready installation without disturbing or requiring alterations in the plumbing fixtures or connections.

Still yet another object of my invention is to provide a valve of the kind mentioned that is relatively simple and economical in construction and highly efficient and durable in use.

With the foregoing and other objects in view that will appear as the nature of my invention is better understood, the same consists in the novel features of construction, combination and arrangement of parts illustrated in the accompanying drawings and more particularly pointed out in the appended claim.

In the accompanying drawings, which are for illustrative purposes only and are therefore not drawn to scale;

Figure 1 is a front elevation of a mixing and volume control valve for hot and cold water, constructed in accordance with my invention.

Figure 2 is a vertical transverse section, taken on line 2—2 of Figure 1.

Figure 3 is a vertical transverse section, taken on line 3—3 of Figure 2.

Figure 4 is a similar view, taken on line 4—4 of Figure 2.

Figure 5 is also a vertical transverse section, taken on line 5—5 of Figure 2.

Figure 6 is a horizontal section, taken on line 6—6 of Figure 2 and Figure 7 is an enlarged detail horizontal section, taken on line 7—7 of Figure 3.

Referring to the drawings for a more particular description of my invention, and in which drawings like parts are designated by like reference characters throughout the several views, my improved valve essentially comprises the hollow cylindrical body or casing 1, having a central bore or opening 2 of rectangular form in cross section, forming the mixing chamber, and closed at its front end by the cover 3, removably secured in place by the fastening screws 4 or other equivalent means.

A hand lever 5 extends forwardly and downwardly at a slight inclination from the cover 3, and is pivoted to the inner or rear face of the latter by means of the ball 6 in such a way that said lever may be raised or lowered in a true vertical plane, or moved to the left or the right in a horizontal plane, but not rotated or turned on its own axis, the purpose of which will presently appear. The ball 6 is mounted in a suitable bearing 7, provided with the rubber gasket or seat 8 to prevent leakage.

The inner face of the ball 6 is formed with an inwardly extending upwardly inclined finger 9, which is disposed in axial alignment with the lever 5 and terminates at its extreme inner or free end in the relatively small ball 10. The ball 10 is connected by means of a hollow sleeve or socket 11 to the center of the valve plate 12. The valve plate 12 works over the front face of the valve disc 13, formed in its upper portion with the central horizontally disposed rectangular opening 14, and in its lower portion with a pair of smaller corresponding intake openings 15 and 16. The openings 15 and 16 are of square or rectangular form and disposed in horizontal and spaced relation with respect to the valve disc.

The opening 14 communicates with the upper vertical port 17, formed in the valve head 18 and leading to the plumbing fixtures or connections, while the intake openings 15 and 16 communicate with the horizontal hot and cold water ports 19 and 20, respectively, formed in opposite sides of the valve head 18 and connected to the water supply. The inner ends of the hot and cold water ports are separated by the vertical wall or partition a and connected with the intake openings 15 and 16 by means of the horizontal right-angularly disposed passages b and c, respectively, of square or rectangular form in cross section, leading from said hot and cold water ports, When the valve plate 12 is in the positioon indicated in Figures 2 and 3 of the drawings, the water supply is completely shut off. To start the flow of water, the hand lever 5 is raised by the operator, which causes the valve plate 12 to slide downwardly over the face of the valve disc 13 until its central opening 21 partially or completely uncovers the hot and cold water openings 15 and 16. The hot and cold water is then admitted or allowed to flow into the mixing chamber 2 of the valve casing 1 and then flows through the openings 14 and port 17 to the fixtures.

The volume of the water is controlled by the degree or extent to which the hand lever 5 is raised and the relative percentage of hot and cold water admitted to the mixing chamber 2 through the openings 15 and 16 is controlled to regulate the temperature of the delivered stream, without changing the volume, by moving said lever to the right or left in order to shift the valve plate 12 accordingly and thereby permit the central opening 21 of said valve plate to expose greater or less areas of said ports.

A coil spring 22 is arranged with one end encircling the bearing sleeve or socket 11 and bearing against the face of the valve plate 12, and with its opposite end fitting in a cup 23 bearing against the ball 6. This spring holds the valve plate 12 against the valve disc 13 at the desired tension, without interfering with the free sliding movement of said valve plate in a vertical or horizontal plane.

A special feature of my invention is the notch or recess 24 formed in the bottom edge of the valve plate 12, which permits a certain amount of flow or leakage of water into the mixing chamber 2, thereby balancing or equalizing the pressure on the valve plate and permitting a small spring of less strength to be used.

From the foregoing description taken in connection with the drawings, it is thought that the construction, operation and advantages of my invention will be readily understood, without requiring a more extended explanation.

Various changes in the form, proportions and minor details of construction may be resorted to without departing from the principle or sacrificing any of the advantages of my invention, as defined in the appended claim.

Having described my invention, what I claim as new and desire to secure by Letters Patent, is:

A mixing and control valve for hot and cold water comprising a valve body formed with a mixing chamber, a valve head having hot and cold water ports and an outlet port, a valve disc having separate openings communicating with said hot and cold water ports and said outlet port, a rectangular oblong valve plate slidably mounted on the front face of the valve disc and formed with a central opening working in either of two right-angularly opposed directions over the openings or slots of the valve disc communicating with said hot and cold water ports, said valve plate having a notch or recess in one edge to allow a certain amount of leakage through one of said slots into the mixing chamber to equalize the pressure against the valve plate, a hand lever for actuating said valve plate in either direction, a coil spring for holding the valve plate against the face of the valve disc at the desired pressure, a removable cover for the valve body and a ball joint permitting the hand lever to swing in either of two right-angularly opposed planes, and a cup fitting against the ball and receiving the adjacent end of the coil spring.

GEORGE E. MANIS.

REFERENCES CITED

The following references are of record in the file of this patent:

UNITED STATES PATENTS

| Number | Name | Date |
|---|---|---|
| 894,280 | McKnight | July 28, 1908 |
| 1,478,688 | Whidden | Dec. 25, 1923 |
| 1,507,973 | Mohn | Sept. 9, 1924 |
| 1,614,437 | Cochran | Jan. 11, 1927 |
| 1,790,168 | Paul | Jan. 27, 1931 |
| 2,020,286 | Bittle | Nov. 12, 1935 |